United States Patent [19]

Nabinger

[11] 4,140,274
[45] Feb. 20, 1979

[54] CONTROL DEVICE FOR A WARM AIR FURNACE

[76] Inventor: Herman G. Nabinger, 311 Kirk Ave., Syracuse, N.Y. 13205

[21] Appl. No.: 795,743

[22] Filed: May 11, 1977

[51] Int. Cl.² .......................................... G05D 23/00
[52] U.S. Cl. ...................................................... 236/11
[58] Field of Search ............... 236/10, 11; 165/DIG. 2

[56] References Cited

U.S. PATENT DOCUMENTS

| | | | |
|---|---|---|---|
| 2,245,773 | 6/1941 | Grant | 236/10 |
| 2,262,823 | 11/1941 | Stearns | 236/10 X |
| 2,289,206 | 7/1942 | Nessell | 236/11 |
| 2,292,830 | 8/1942 | Gauger et al. | 236/10 X |
| 2,704,571 | 3/1955 | Reichelderfer | 236/11 X |
| 2,862,666 | 12/1958 | Kriechbaum | 236/11 X |

Primary Examiner—William E. Wayner
Assistant Examiner—William E. Tapolcai, Jr.
Attorney, Agent, or Firm—Bruns & Jenney

[57] ABSTRACT

Control apparatus for regulating the operation of a warm air furnace having a conventional thermostat control arranged to turn the furnace burner on and off. Circuit means are arranged to override the thermostat to turn the burner off when the temperature of the flue gases leaving the furnace are above a first level and to hold the burner inactive until the flue temperature drops to a second lower level. A bypass circuit is also provided to hold the burner in operation anytime conditioned air returned to the furnace from the comfort zone falls below a predetermined temperature.

12 Claims, 2 Drawing Figures

CONTROL DEVICE FOR A WARM AIR FURNACE

BACKGROUND OF THE INVENTION

This invention relates to an improved control device for regulating the operation of a warm air furnace.

Many different control devices are known and used in the art for regulating the operation of hot air furnaces. Most of these devices are adapted to sense the temperature of the conditioned air within the comfort control zone and to employ this parameter as the controlling factor in determining when the burner and/or blower are to be cycled on and off. However, the temperature of the conditioned air in the control zone is not truly indicative of the operational state of the furnace and, as a result, the furnace is generally permitted to become too cool when cycled off or to become too warm when in operation. Consequently, the burner is required to be on longer than is necessary for the amount of heating produced and, as a result, the furnace consumes an excessive amount of fuel.

SUMMARY OF THE INVENTION

It is therefore an object of the present invention to improve apparatus for controlling the operation of a warm air heating system.

It is a further object of the present invention to conserve the amount of fuel consumed by a warm air heating system.

Another object of the present invention is to control the operation of a warm air furnace in response to the flue gas temperature and the temperature of conditioned air returned to the furnace to minimize the time that the furnace burner is required to remain in operation.

A still further object of the present invention is to provide a control circuit for a warm air furnace capable of independently regulating the operation of the system burner and the system blower.

These and other objects of the present invention are attained by means of a control apparatus for regulating the operation of the burner of a warm air furnace which includes a thermostat for cycling the burner on and off in response to the temperature of conditioned air maintained in a comfort control zone, first circuit means for overriding the thermostat for terminating the activity of the burner when the flue gas temperatures rises to a first level and to hold the burner inactive until the flue gas temperature falls to a second level and second circuit means for bypassing the first circuit means to hold the burner operative anytime the temperature of the conditioned air returned to the furnace from the control zone falls below a predetermined level.

Independent circuit means is also provided for controlling the operation of the furnace blower whereby the blower is rendered operative anytime the thermostat calls for heat or, alternatively, when excessive heat is present in the warm air plenum of the furnace. The blower circuit contains switching means for reversing the blower response to the thermostat whereby the blower will circulate air through the comfort control zone during summer months when the burner is shut down when the zone temperature is above the preset thermostat temperature.

BRIEF DESCRIPTION OF THE DRAWINGS

For a better understanding of the present invention as well as other objects and further features thereof, reference is had to the following detailed description of the invention to be read in connection with the accompanying drawings, wherein.

DESCRIPTION OF THE PREFERRED EMBODIMENT

Figure 1:
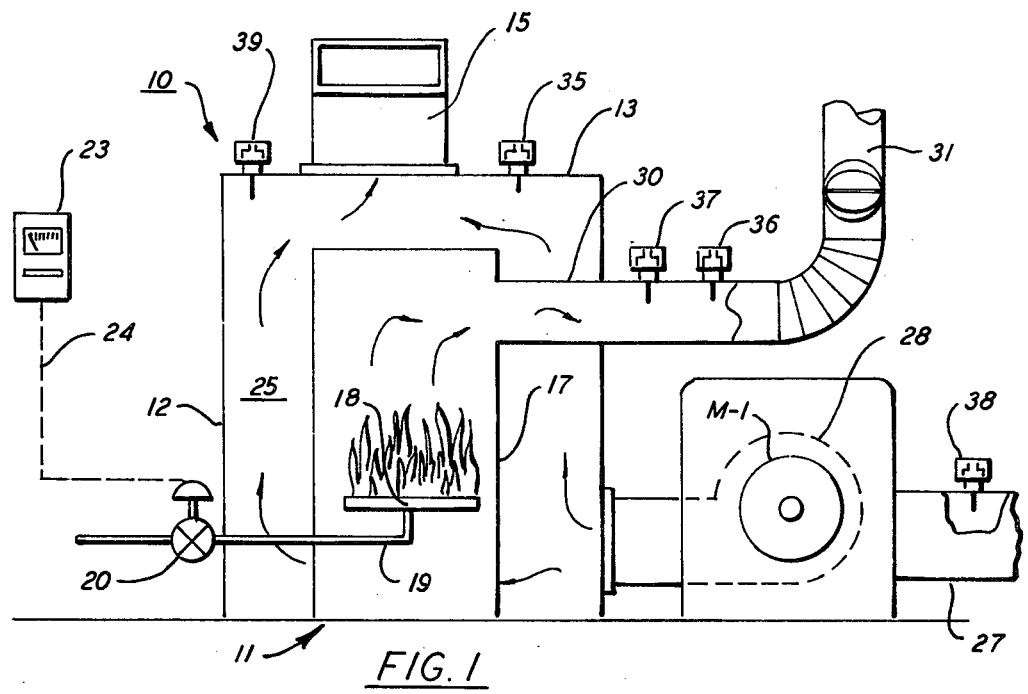
FIG. 1 is a diagrammatic representation of a warm air furnace embodying the teachings of the present invention.

Referring initially to FIg. 1, there is shown in diagrammatic form a warm air heating system 10 that includes a furnace 11 equipped with a forced air fan or blower 28. In the preferred embodiment, the system will be described as a gas fired installation, however, it should be evident from the disclosure that the control apparatus of the present invention, which is utilized to regulate the operation of the system, can be employed in conjunction with a warm air furnace fired by any suitable commercially available fuel known and used in the art.

As illustrated, the furnace is provided with an internal fire box 17 that is surrounded by an outer casing 12 to provide an air chamber or warm air plenum 25 therebetween. The upper region of the plenum, which is generally referred to as the bonnet 13, contains a warm air outlet duct 15 for carrying warm conditioned air generated in the plenum to a remote comfort control zone. Although not shown, the comfort control zone will typically be the interior of a house or the like normally requiring the circulation of conditioned air therethrough in order to maintain the zone at some desired comfort level.

Housed within the fire box of the furnace is a burner 18, equipped with an ignition system, for converting the delivered gas into usable heat energy. The burner is operatively connected to an electrically operated gas control valve 20 by gas pipe 19. The valve is adapted to be either turned on or off in response to an electrical signal from the control apparatus so as to activate or inactivate the burner or demand. The gas valve is connected, as illustrated, by the dotted line 24 in FIG. 1, to a thermostat 23 that is physically located in the comfort control region. The operation of the thermostat shall be explained in greater detail below.

Conditioned air is returned from the comfort control zone via a return air duct 27 connected to the inlet of the forced air fan 28. Typically, the fan is of the centrifugal type and is driven by an electrical motor M-1 to force the conditioned air through the system as illustrated by the arrows. Under the influence of the fan, the return air is caused to flow in heat transfer relationship about the fire box thereby causing the air to be heated prior to its leaving the plenum via outlet duct 15.

A number of thermosensitive switches are strategically positioned about the furnace for sensing various temperature conditions important to the efficient operation of a warm air furnace. As noted in FIG. 1, two of these sensing devices are operatively positioned in the flue pipe 30 which carries the waste products of combustion from the furnace to a chimney 31. The first is a high temperature thermoswitch 36 equipped with a probe that extends into the flue pipe and which is arranged to sense the temperature of the flue gases within the pipe. A second low temperature thermoswitch 37 of similar construction is also located in the flue pipe adjacent the high temperature device. As is conventional, each device has a set of contacts associated therewith that are set to open and close at a predetermined temperature.

Two other thermoswitching devices of similar construction are employed to sense the temperature of conditioned air moving through the system. These include thermoswitch 38 located in the return air duct 27 and thermoswitch 39 positioned adjacent to the outlet duct 15 in the furnace bonnet. The probe of thermoswitch 38 is arranged to sense the temperature of conditioned air returning from the comfort zone to the furnace while that of thermoswitch 39 serves to sense the temperature of air being delivered from the furnace back into the comfort zone.

An overtemperature sensing device 35 is also located in the bonnet and, as will be explained below, the device will function to inactivate the burner when the bonnet temperatures reach or exceed some predetermined danger level.

Figure 2:
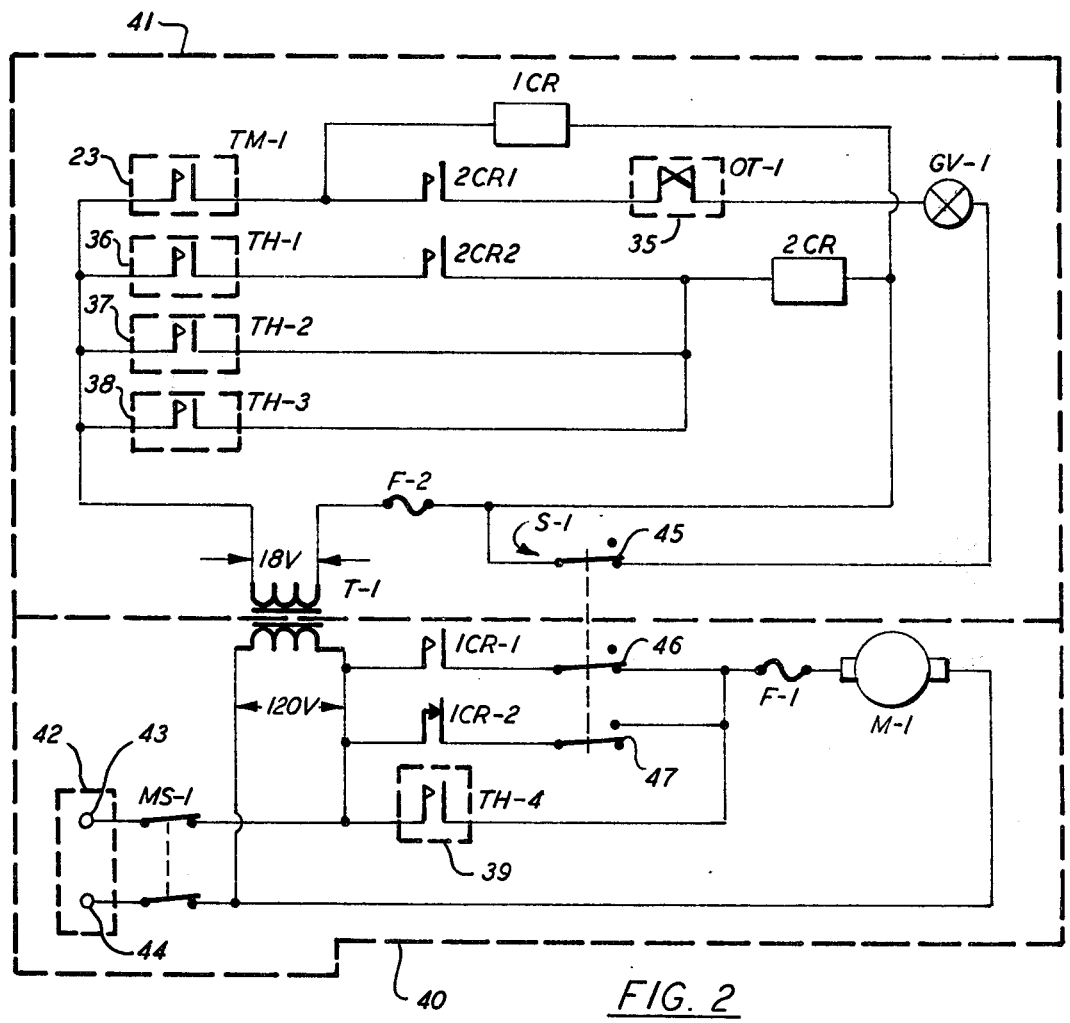
FIG. 2 is an electrical diagram showing the control apparatus of the present invention utilized in the warm air system illustrated in FIG. 1.

Turning now to FIG. 2, the operation of the warm air heating system will be explained in greater detail with reference to the electrical diagram shown therein. The illustrated electrical control apparatus includes two main sections; a high voltage fan motor control section 40 and a low voltage gas valve control section 41. Power to both sections is provided by a conventional 120 volt power supply 42. The high voltage section 40 is connected directly to the power supply by means of terminals 43 and 44. A step down transformer T-1 is employed to bring 18 volt service to the low voltage section from the power supply. A master switch MS-1, at the power supply, permits both sections to be disconnected therefrom by manual opening of the switch.

A fuse F-1 is wired into the high voltage section for preventing overloading of the circuit. Fuse F-2 is similarly employed in the low voltage section.

As is typical in most warm air furnaces, the thermostat 23 is located in the comfort control zone and is capable of sensing the temperature of the air therein. The burner of the system may be cycled on and off in response thereto. The thermostat contains a set of contacts TM-1 which are electrically positioned in series with the gas valve circuit GV-1 located in the low voltage section. The contacts are arranged to open when the temperature of the zone air reaches the preset comfort level set into the thermostat and to close when the temperature of the comfort air falls about two degrees below the set point. For purposes of explanation, it shall be assumed that the thermostat is set for 68° F. Accordingly, the contacts will open on a temperature rise at 68° and close on a temperature fall at 66°.

With the closure of TM-1, a relay 1CR in the low voltage section becomes immediately energized. This, in turn, causes normally opened contacts 1CR-1 in the high voltage section to be pulled closed and normally closed contacts 1CR-2 in the same section to be opened. Both of the relay operated contacts are wired in series with the fan motor M-1. With the closure of 1CR-1 a path is provided for current to reach the motor through contact 46 of a manually operated three pole, double throw, switch S-1. As a result, the fan normally comes on as soon as the thermostat calls for heat.

Switch S-1 provides an electrical link between the two sections. The switch has a first setting, as shown in FIG. 2, which is used when the system is required to provide warm air to the comfort control region. The second or opposite setting is used when heating is not necessary but when the circulation of air through the control zone is desirable, as for example, on a warm summer day. The switch thus enables manual selection of two different modes of operation; a first heating mode and a second air circulating mode.

In the heating mode, contact 45 of switch S-1 is closed placing one side of gas valve control GV-1 in electrical communication with transformer T-1. Contact 46 is also closed at this time while contact 47 is held open. As noted, with contact 46 closed and contact 1CR-1 being held closed by energized relay 1CR, the fan motor is immediately brought on the moment the system thermostat calls for heat.

However, the present control apparatus does not immediately turn on the burner upon the closure of the thermostat switch. The temperature of the gases contained in the flue pipe is first monitored by the two thermoswitches 36 and 37 to determine if efficient operation of the burner can be maintained prior to switching the burner on. The high temperature device 36 has a set of contacts TH-1 associated therewith that are adapted to close at about 345° F. and open at 350° F. The low temperature device 37, on the other hand, has a set of contacts TH-2 that are adapted to close at about 245° F. and open at 250° F.

It will be assumed that at start up, the flue gas temperature is below the lower limit of thermoswitch 37. Accordingly both TH-1 and TH-2 will be closed. Current can therefore flow to relay 2CR thus causing it to be energized. This, in turn pulls in contacts 2CR-1 and 2CR-2 located in the low voltage section. With TM-1 and 2CR-1 both closed, the gas valve is opened through the instrumentality of GV-1 and the burner is ignited.

As the flue gas temperatures rise in response to burner operation, the opening temperature of TH-2 is exceeded. However, TH-1 remains closed and this closed contact acting in series with 2CR-2 provides a holding circuit for keeping 2CR energized. As a result, the burner will not shut down until either TM-1 or TH-1 open. contact TM-1 will open when thermostat 23 is satisfied signalling that the desired comfort level has been reached. Contact TH-1, however, is arranged to override the thermostat and shut down the burner via GV-1, when the upper flue gas temperature is reached or exceeded.

It should be noted that when the thermoswitch 36 overrides the thermostat 23, contact TM-1 remains closed thus holding the fan operative through the action of energized relay 1CR. As a result, the high temperatures developed in the furnace are still utilized to provide heat within the comfort control zone. At the high temperatures involved, this residual energy can be considerable. As can be seen, through this control feature, the apparatus has the unique ability to sense when too much energy is being consumed and take corrective action in response thereto while, recognizing that the thermostat has not been satisfied, holding the fan in operation so that all available energy present in the plenum is effectively utilized. The fan will continue in operation until such time as the thermostat is satisfied.

If thermostat 23 is not satisfied before the lower temperature limit of thermoswitch 37 is reached TH-2 will be closed and the burner once again is restarted as described above. As can be seen, the thermostat is permitted to control the system only within very specified limits as dictated by the temperature of the gases contained in the flue pipe. The furnace, consequently, is not permitted to become excessively hot nor excessively cool. Accordingly, the burner is not required to overwork at the beginning and the end of heat burning cycles. This, of course, is reflected in an efficient utilization of fuel.

To further conserve energy, the blower is caused to operate any time that the bonnet temperature exceeds a predetermined limit, such as 125° F. or above, and the thermostat switch TM-1 is open. Upon this occurrence, the probe of thermoswitch 39 senses the undesirable condition and causes contacts TH-4 in the high voltage circuit to close. This, in turn, places 120 volts over the fan motor putting the fan into operation. The fan will continue to pump warm air into the comfort zone until such time as the bonnet temperature drops to a more normal level. When the sensing device 39 detects that the bonnet temperature has dropped sufficiently, TH-4 opens and motor M-1 is inactivated.

There may be times when the temperature in the comfort control zone undergoes a rather drastic change in temperature, as for example, when a door or window is left open for a long period of time on a relatively cold day. As can be seen, under these conditions, the temperature in the control zone could possibly be at a relatively low level when, at the same time, the high temperature thermoswitch signals for the burner to shut off. To avoid this unwanted result, the return air temperature is continually monitored and corrective action taken by the control system to prevent premature burner shut down when the comfort control zone temperature is at a relatively low level.

To this end, thermoswitch 38 is operatively positioned in the return air duct 27. The device is adapted to control the operation of contact TH-3 which forms a bypass circuit around both the high temperature and low temperature sensing circuits as illustrated in FIG. 2. The contact TH-3 is arranged to close at about 55° F. on a falling temperature and to reopen at 60° F. on a rising temperature. As a result, when the return air is at or below a temperature of 55° F., the relay 2CR is held energized via the bypass circuit regardless of the condition sensed by either of the flue gas thermoswitches. Accordingly, 2CR-1 will remain closed along with the thermostat contact TM-1 to provide a path for current to reach the gas valve control and thus maintain the valve in an open position until such time as the comfort air temperature is again normalized.

As noted above, manually operated switch S-1 can be repositioned to inactivate the burner during warm periods while still permitting the fan to circulate air through the system in response to the thermostat. With the switch S-1 repositioned, contact 46 is opened thereby preventing current from reaching GV-1 and thus insuring that the burner will not be activated. Repositioning the switch also causes contact 46 to open and contact 47 to close which, in effect, changes the control function of the thermostat in relation of the fan motor. This is accomplished by reversing the function of contact 1CR-1 and 1CR-2 through the repositioning of S-1. As can be seen, when TM-1 is open 1CR remains deenergized and normally closed contact 1CR-2 provides a path through contact 47 to activate the fan motor M-1. However, when TM-1 closes, as for example, when the temperature in the control zone drops below the preset temperature, the relay 1CR becomes energized thereby opening 1CR-1 and deactivating the motor.

Under the above noted conditions, the fan will come on only when the thermostat is satisfied, that is, when the air temperature is higher than the set temperature. On a warm day, therefore, the fan can be controlled by the thermostat to provide circulating air. For example, if the thermostat is set for 75° F. and the ambient air temperature is 85° F., the fan will circulate air continually until the set temperature is reached. When the furnace is located in a relatively cool basement or the like, a good deal of cooling can be realized by this feature without consuming much energy.

It should be clear from the disclosure above that the present control apparatus, although described in reference to a forced air system can be equally well adapted for use in conjunction with a natural draft system by simply employing the control circuitry found in the low voltage section. While this invention has been disclosed with regard to this specific structure, it is not necessarily confined to the details as set forth, and this application is intended to cover any modifications or changes as may come within the scope of the following claims.

I claim:

1. In a warm air furnace of the type having an outlet for delivering warm conditioned air from the furnace to a control zone, a return for bringing conditioned air from the zone back to the furnace for reheating, a control valve for supplying fuel to a burner and a thermostat having a switch for operating the valve in response to the air temperature within the control zone whereby the switch is closed when the temperature falls below a preset level thereby opening the valve, and is opened when the temperature reaches the preset level thereby closing the valve, the improvement comprising first circuit means for overriding the thermostat for closing the valve when the temperature of the flue gases in the furnace reaches a first elevated level and for holding the valve closed until the flue gas temperatures fall to a second lower level, and second circuit means for bypassing the first circuit means and holding the valve open when the temperature of the return air falls below a predetermined level.

2. The improvement of claim 1 further including
a control valve relay operatively associated with said first and second control means, and
a contact positioned in series between the thermostat switch and the valve being responsive to the control valve relay so that the contact is closed when said relay is energized and is opened when said relay is deenergized.

3. The improvement of claim 2 wherein said first circuit means includes
a low temperature thermoswitch operatively associated with the flue pipe of the furnace being arranged to energize said control valve relay when the flue gas temperature falls below said second lower level and to deenergize the relay when the flue gas temperature is raised above said second lower level, and
a holding circuit in series with the control valve relay having a high temperature thermoswitch operatively associated with the flue pipe of the furnace being arranged to open when the flue gas temperature is raised above said first elevated level and to close when the flue gas temperatures fall below said elevated level and a contact responsive to said control valve relay being in series with the high temperature thermoswitch being arranged to close when the control valve relay is energized and to open when said relay is deenergized.

4. The improvement of claim 3 wherein said second circuit means includes a thermoswitch positioned in the return and being placed in parallel over said first circuit means and being arranged to hold said control valve relay energized when the return air temperature falls below said predetermined level.

5. The improvement of claim 1 further including blower means for circulating air from the furnace through the control zone.

6. The improvement of claim 5 further including independent blower control means for regulating the operation of said blower having a blower control relay which is energized when the thermostat switch is closed and blower contact means responsive to the relay for activating the blower when said relay is energized.

7. The improvement of claim 6 further including a sensing means positioned in the warm air bonnet of the furnace and being arranged to hold the blower active when the bonnet air temperature exceeds a predetermined temperature.

8. The improvement of claim 6 further including switch means for opening the circuit to the burner control valve and for reversing the function of said blower contact means whereby the blower is activated when the thermostat switch is opened and is inactivated when the thermostat switch is closed.

9. In a warm air furnace of the type having a thermostat operatively associated with the burner control valve for activating and inactivating a burner, and means to circulate warm air from the furnace to a comfort control zone and back to the furnace, the method of controlling said furnace including the steps of sensing the temperature of the flue gases leaving the furnace, overriding the thermostat to inactivating the burner when said flue gas temperature reaches a first elevated temperature level, holding the burner inactive until said flue gas temperature falls to a second lower level, sensing the temperature of the conditioned air returned to the furnace, and maintaining the burner in operation after said first flue gas temperature is exceeded when the temperature of the return air falls below a predetermined level.

10. The method of claim 9 further including the steps of providing a blower for circulating the conditioned air, and activating said blower when the thermostat activates said burner.

11. The method of claim 10 further including the steps of activating the blower when the temperature of the conditioned air in the furnace exceeds a predetermined temperature.

12. The method of claim 10 including the steps of manually inactivating said burner, and reversing the function of said thermostat whereby the blower is inactivated when the thermostat calls for activation of said fuel valve.

* * * * *